(12) United States Patent
Sakai

(10) Patent No.: US 6,469,709 B1
(45) Date of Patent: *Oct. 22, 2002

(54) IMAGE EDITING METHOD AND APPARATUS

(75) Inventor: Tetsuo Sakai, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,854

(22) Filed: Dec. 22, 1997

(30) Foreign Application Priority Data

Dec. 26, 1996 (JP) ................................ 8-348438

(51) Int. Cl.$^7$ .......................... G06T 11/00; G06F 13/00
(52) U.S. Cl. ....................................... 345/619; 345/700
(58) Field of Search ................................ 345/700, 763, 345/848, 856, 157, 619, 649, 672, 660, 441

(56) References Cited

U.S. PATENT DOCUMENTS

| | | | | |
|---|---|---|---|---|
| 5,345,543 A | * | 9/1994 | Capps et al. | 345/437 |
| 5,396,590 A | * | 3/1995 | Kreegar | 345/347 |
| 5,524,198 A | | 6/1996 | Matsumoto et al. | 395/157 |
| 5,588,098 A | * | 12/1996 | Chen et al. | 345/437 |
| 5,613,019 A | * | 3/1997 | Altman et al. | 382/311 |

* cited by examiner

Primary Examiner—William A. Cuchlinski, Jr.
Assistant Examiner—Thu Nguyen
(74) Attorney, Agent, or Firm—Fitzpatrick, Cella, Harper & Scinto

(57) ABSTRACT

When a drawn object displayed on a screen is selected in an image processing system of the present invention, a selection frame and an operation area for performing a particular operation on the drawn object are displayed. When a center of the drawn object is designated with a pointing device and dragged, the center is moved to a dragged position. When a line segment, connecting the center with a predetermined point on the selection frame, is designated with a pointing device and dragged, the selected drawn object is rotated for a dragged amount. Enlargement or reduction in the lateral or longitudinal directions, or skewing are similarly performed. When an operation area corresponding to each operation is designated, editing processing corresponding to the designated operation area is performed on the object of interest.

20 Claims, 17 Drawing Sheets

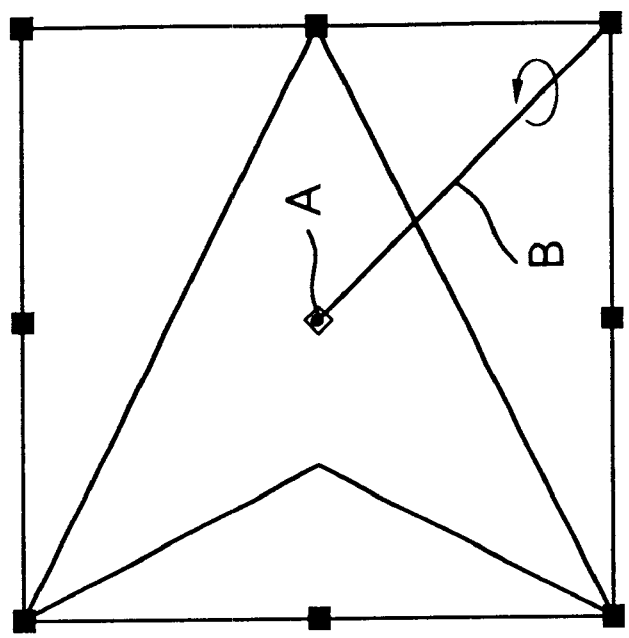
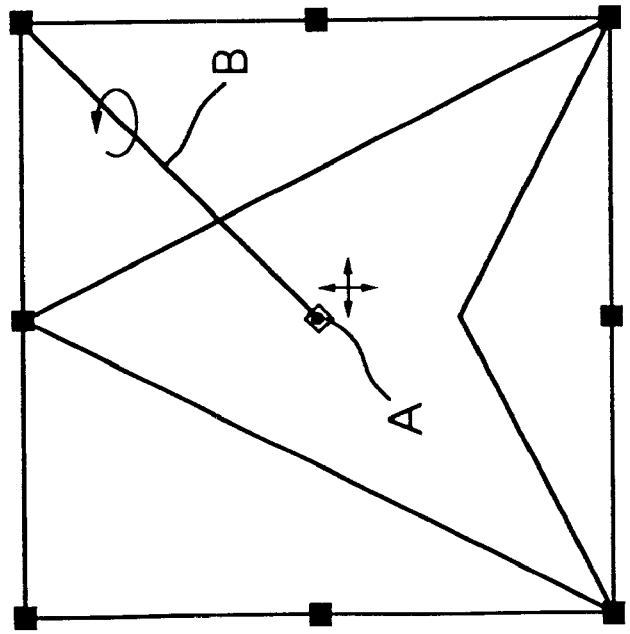
FIG.7A

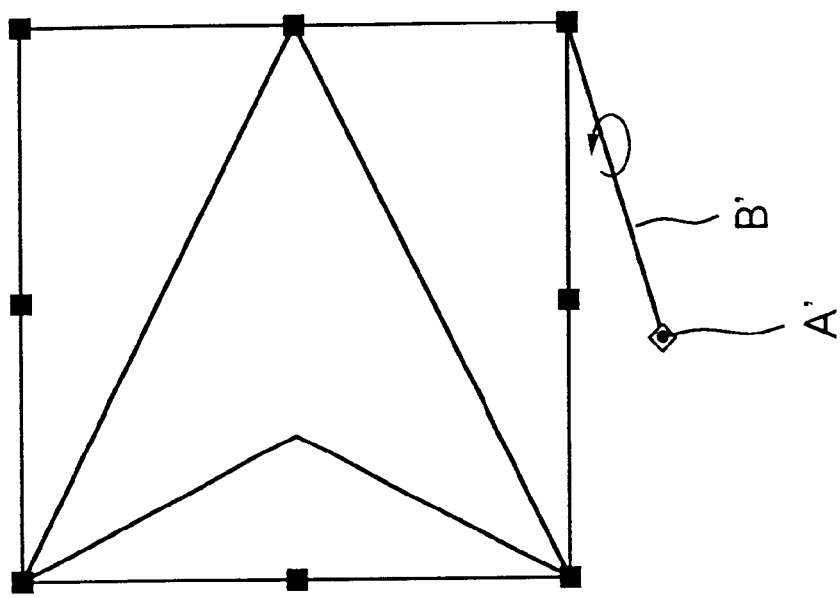
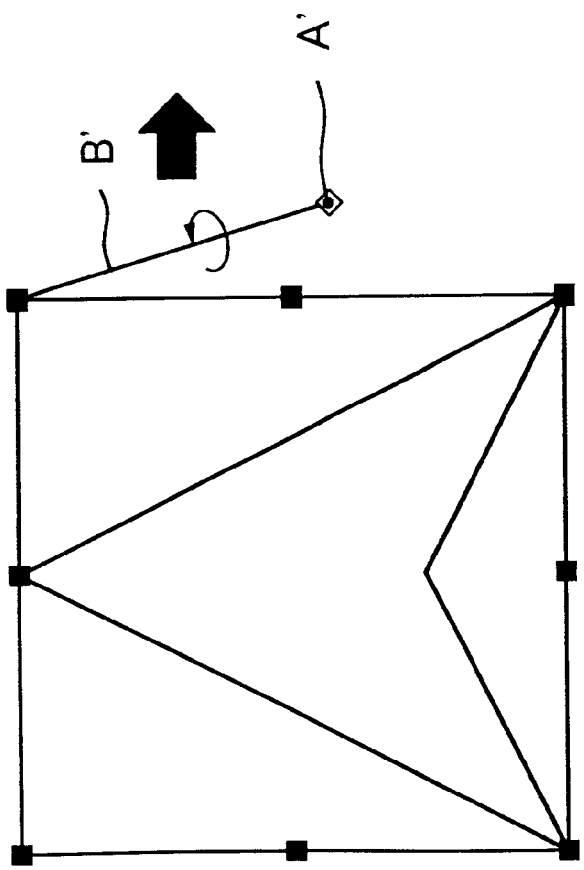
FIG.7B

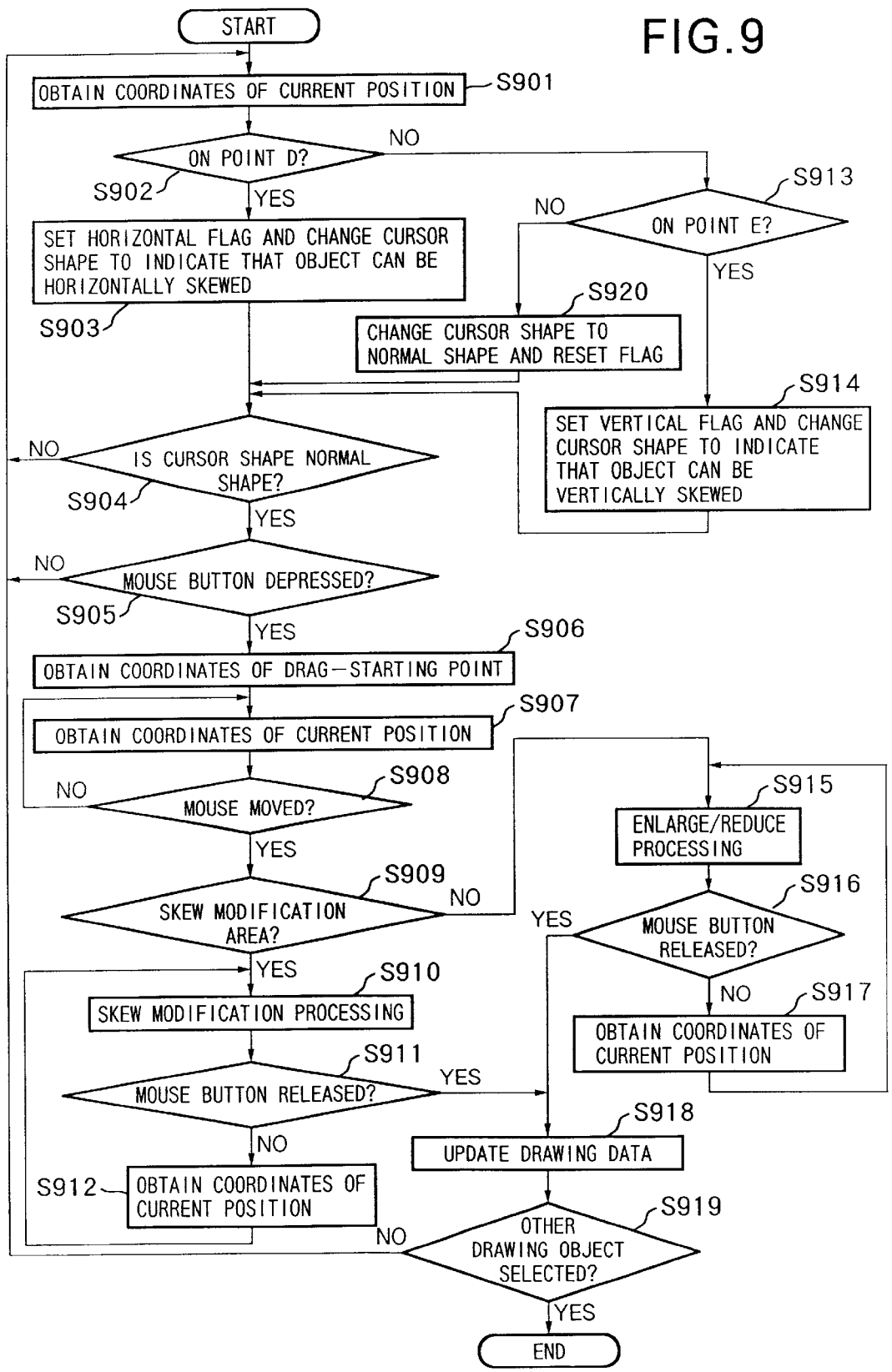

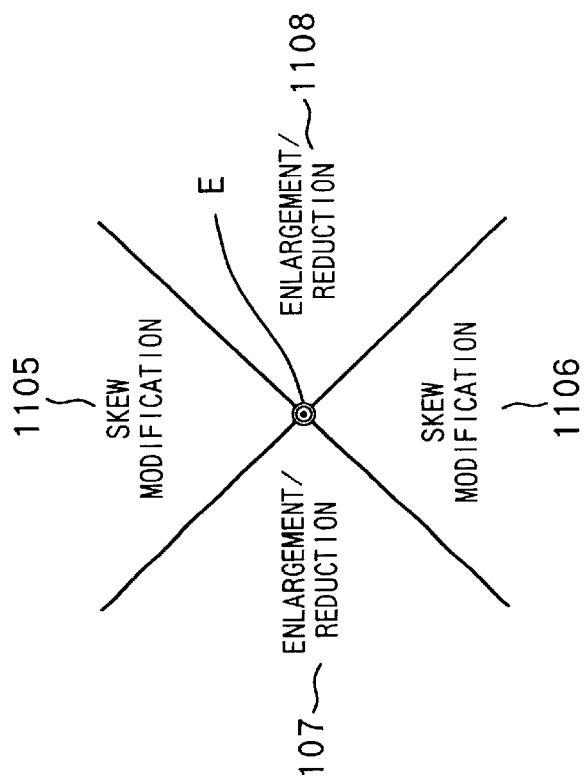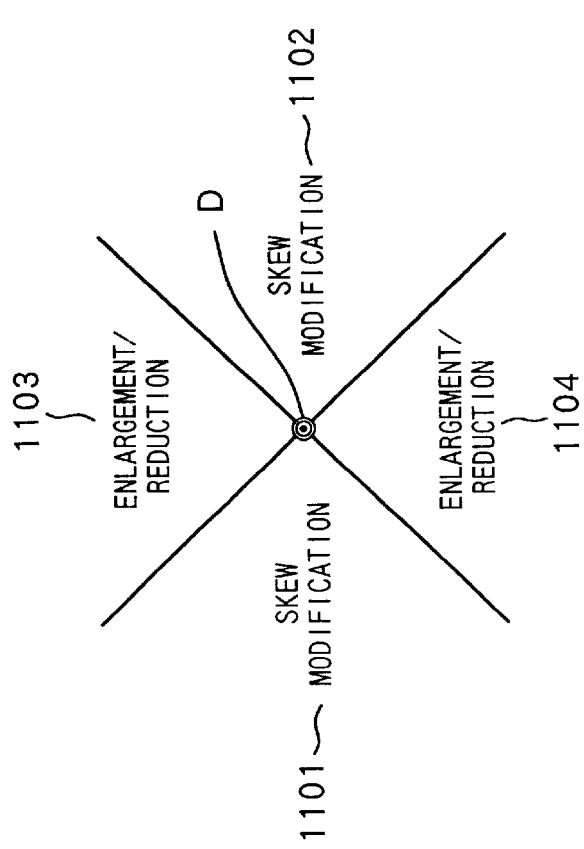

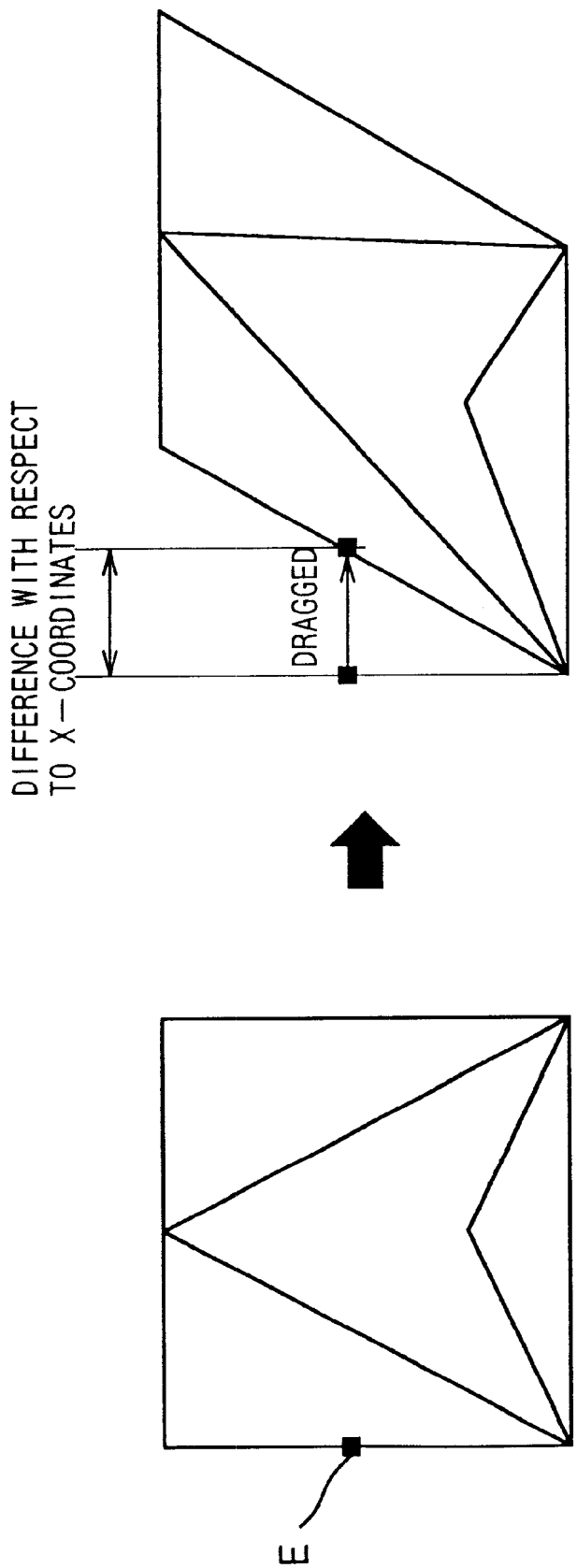

IMAGE EDITING METHOD AND APPARATUS

BACKGROUND OF THE INVENTION

The present invention relates to an image editing method and apparatus for a drawing processing application program capable of editing a drawn object displayed on a screen of an apparatus typically represented by a personal computer, word processor, desktop publishing apparatus and the like.

Conventionally, when an operator performs modification such as rotating processing or skew modification or the like on a drawn object displayed on a screen, the operator selects an editing mode corresponding to the modification such as rotation, skewing or the like upon selecting the object to be modified. Then, the operator drags the selected object with a pointing device, or specifies parameter values in a dialogue box to modify the object.

As described above, the conventional operation for modifying a drawn object necessitates mode designation which is unnecessary for normal operation for generating or moving a drawn object.

Therefore, the operator must frequently operate with a Pointing device or keyboard during the editing operation, causing troublesome editing operation and inefficient work.

SUMMARY OF THE INVENTION

The present invention has been made in consideration of the above situation, and has as its object to provide an image editing method and apparatus which do not require an editing mode such as a rotation mode or skew modifying mode or the like, by providing an apparatus which can edit a drawn object by simple operation.

In order to attain the above objects, the image editing method and apparatus according to the present invention has the following configuration.

More specifically, according to an aspect of the present invention, an image editing method of editing a drawn object displayed on a screen comprises: a selection displaying step of displaying an operation area for performing operation on a selected drawn object serving as an object of interest; a position designating step of designating a desired position on the screen; and an editing step of, in a case where the operation area is designated in the position designating step, performing editing processing corresponding to the designated operation area and operation performed in the designated operation area on the object of interest.

Furthermore, according to another aspect of the present invention, an image editing apparatus comprises: designating means for designating a desired position on a screen; selection displaying means for selecting a drawn object designated by the designating means as an object of interest and displaying an operation area for performing operation on the object of interest; and editing means for, in a case where the designating means designates anywhere in the operation area, performing editing processing corresponding to the designated operation area and operation performed in the designated operation area on the object of interest.

Still further, according to another aspect of the present invention, a computer-readable storage medium having a computer program for editing a drawn object displayed on a screen, the program includes: a selection displaying process step for displaying an operation area for performing operation on a selected drawn object serving as an object of interest; a position designating process step for designating a desired position on the screen; and an editing process step for, in a case where the operation area is designated in the position designating process step, performing editing processing corresponding to the designated operation area and operation performed in the designated operation area on the object of interest.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 7A and 7B are diagrams showing rotation processing of a drawn object;

FIG. 9 is a flowchart showing the steps of processing of a drawn object edit program according to the second embodiment;

FIGS. 11A and 11B are illustration showing types of modifying processing corresponding to mouse movement;

FIGS. 12A and 12B are diagrams showing skewing processing of a drawn object;

DETAILED DESCRIPTION OF THE PREFERRED EMBODIMENTS

Preferred embodiments of the present invention will be described in detail in accordance with the accompanying drawings.

[First Embodiment]

Before describing an edit program for editing a drawn object which is the first embodiment of the present invention, the basic process of executing the edit program will be first described with reference to FIG. 1.

Figure 1:
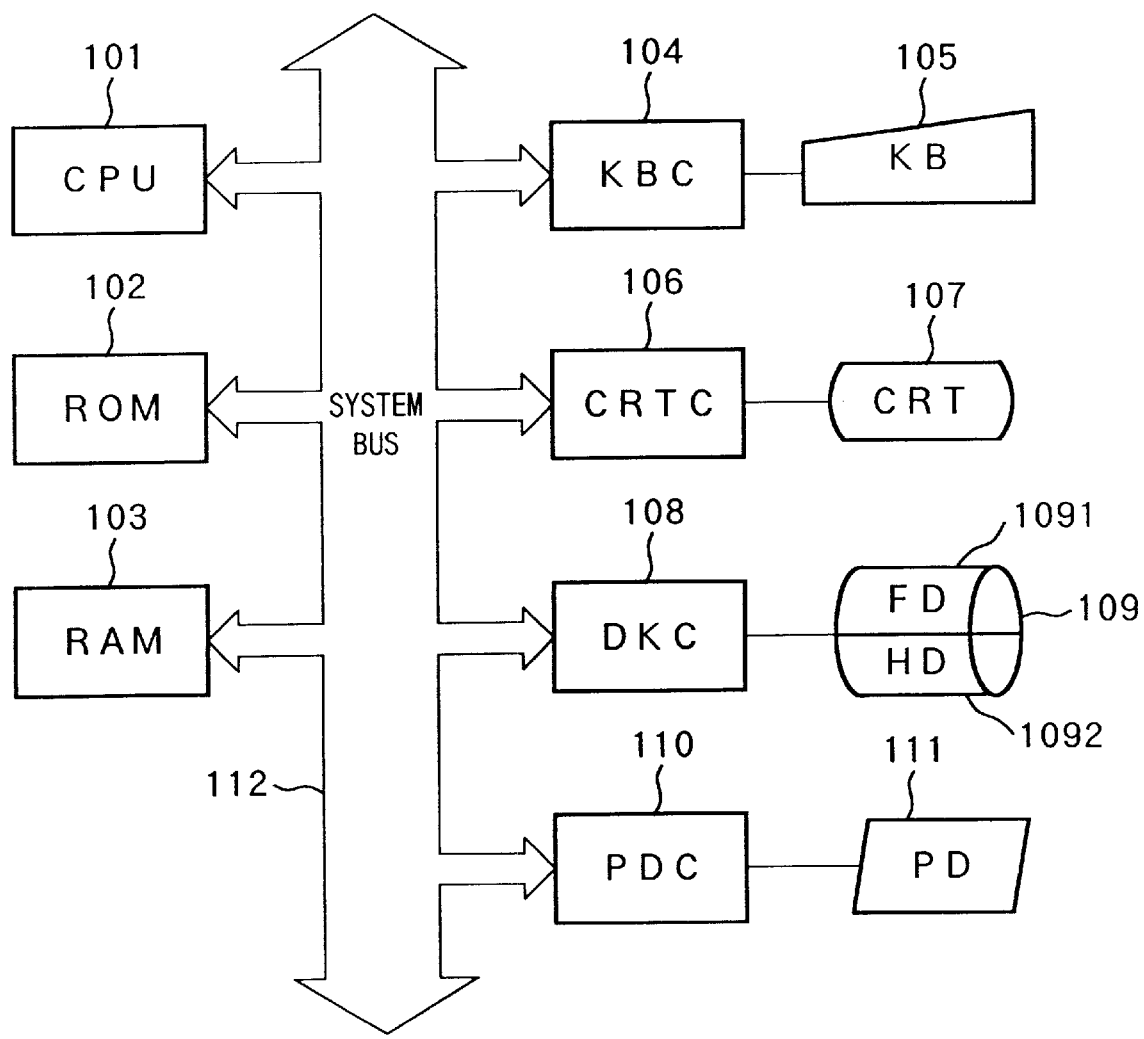
FIG. 1 is a block diagram showing an image processing system according to the present embodiment.

FIG. 1 is a block diagram showing the fundamental structure of an image processing system where the drawn object edit program according to the present embodiment is operated. In FIG. 1, a central processing unit (CPU) 101 controls the entire system and executes computing processes. A read-only memory (ROM) 102 is a memory for a system start-up program and the like. A random access memory (RAM) 103 is a memory where the use of the memory area is not limited to a specific purpose, for loading data and programs for various processing which will be explained later with reference to flowcharts. A keyboard controller (KBC) 104 receives input data inputted by a keyboard (KB) 105 and transmits the data to the CPU 101. A display controller (CRTC) 105 receives data and executes displaying on a CRT 107. An external memory controller (DKC) 108 controls an external memory 109 such as a floppy disc (FD) or hard disc (HD) or the like. The external memory 109 such as FD or HD or the like stores programs and data which are loaded by the CPU 101 upon necessary for being executed, referred to or processed. A pointing device controller (PDC) 110 controls input data inputted by a pointing device (PD) 111 such as a mouse or tablet and the like. A system bus 112 serves as a data path among the above-described components.

The present image processing system is operated by the CPU executing a basic I/O program, operating system (OS) and drawn object edit program. The basic I/O program is written in the ROM 102, and the OS is stored in an HD 1092 as a program file. When power of the present system is turned on, the OS is read into the RAM 103 from the HD 1092 by virtue of the initial program load function in the basic I/O program, thereby OS operation is started. Upon starting the OS, the drawn object edit program loaded in the RAM 103 according to an instruction by a user or a predetermined setting, is operated under the OS.

The system, in which the drawn object edit program is operated, is referred to as an image processing system in the present embodiment. In the system, a drawn object is generated, edited, displayed and printed. A drawn object is read from another image processing apparatus or image reading apparatus via the FD 1091 or via a communication path (not shown). Alternately, a drawn object is generated by an operator by utilizing the KB 105 or PD 111. The present system enables an operator to perform various editing on these drawn objects. Among the various editing processing, the following description will be provided on rotating processing and skew modifying processing performed on a drawn object.

The image processing system according to the present embodiment enables to perform rotating processing on a selected drawn object without necessitating an operator to designate an editing mode for the rotating process.

Figure 2B:
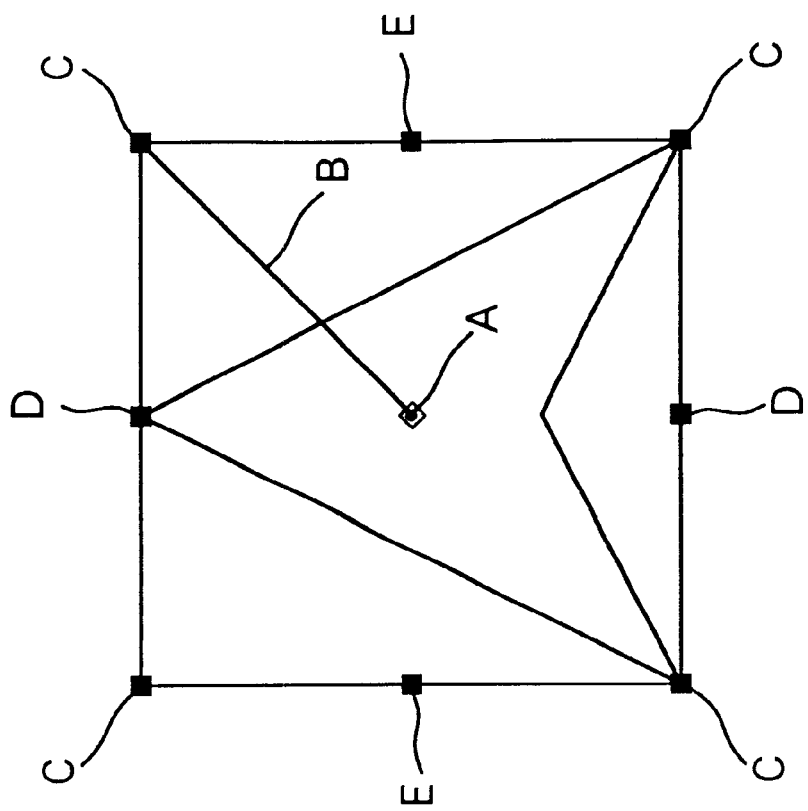
FIGS. 2A and 2B are diagrams showing a drawn object and a selected state of the object.
Figure 2A:
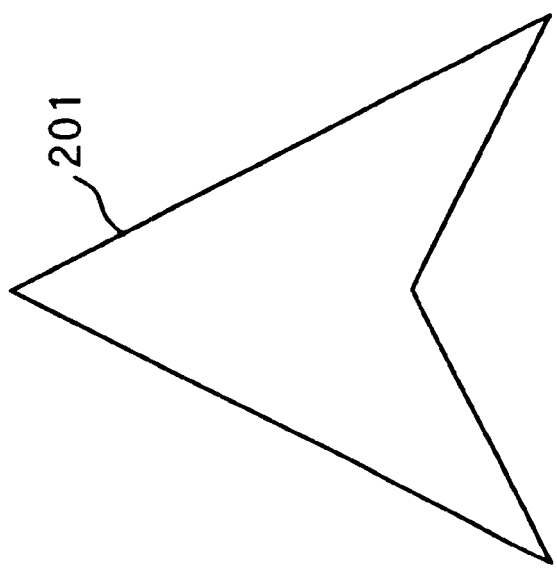
Figure 16:
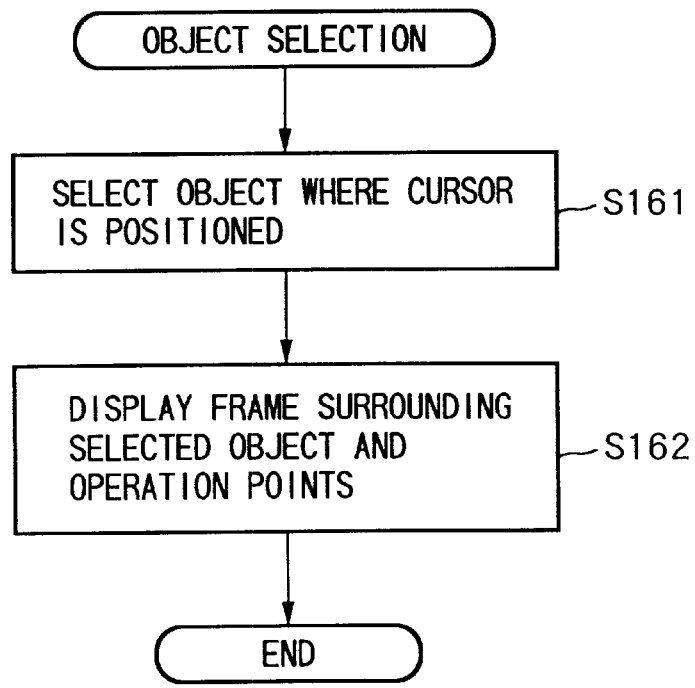
FIG. 16 is a flowchart showing the steps of selecting a drawn object.

First, description will be provided with reference to FIGS. 2A and 2B on a selected state of a drawn object. FIG. 2A shows an example of a drawn object subjected to editing. Assume that a drawn object 201 in FIG. 2A is formed in advance and is displayed in the CRT 107. When the drawn object 201 is displayed on the screen of the CRT 107, if an operator performs selecting operation by designating the drawn object 201 with the PD 111, selecting processing according to the steps shown in FIG. 16 is performed. The selecting operation is, for instance, placing a mouse pointer on the drawn object and clicking or double-clicking (click the mouse twice within a predetermined time) the mouse button.

When the selecting operation is performed, the processing shown in FIG. 16 is started. First, a drawn object, where the cursor is positioned at that time, is selected (step S161), and a frame surrounding the selected drawn object and operation points are displayed (step S162).

Figure 3B:
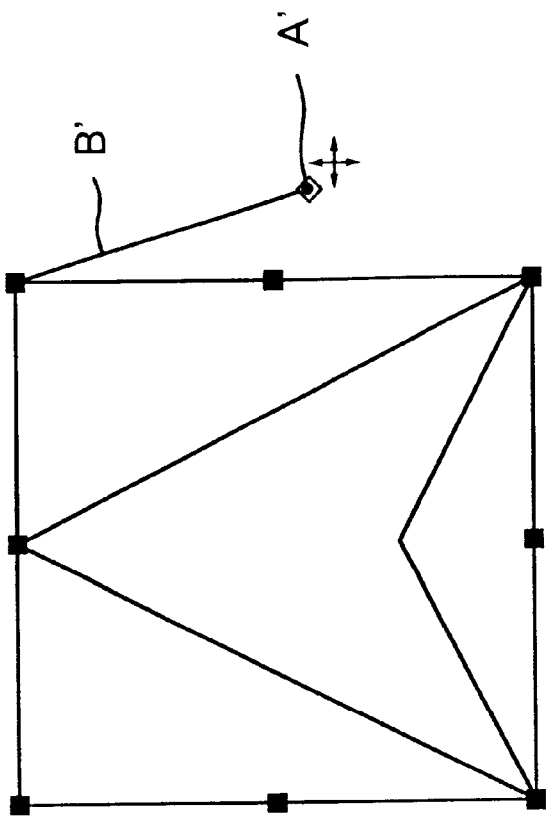
FIGS. 3A and 3B are diagrams showing moving processing of a rotation center.
Figure 3A:
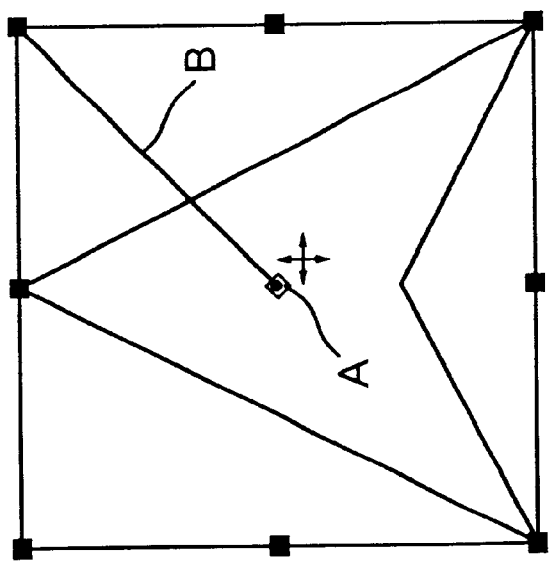

FIG. 2B shows the displayed state of the drawn object 201 being selected as an editing subject. The point A in FIG. 2B denotes the center of rotation for rotating the drawn object. The drawn object 201 is rotated on this point by the rotating operation. The rotation center A may be moved to an arbitrary position by dragging the point A with the pointing device. "Dragging" means moving a cursor while selecting an object which is subjected to be moved together with the cursor movement. In a case where a mouse is used as a pointing device, dragging is performed by depressing a mouse button when the mouse cursor is positioned on top of the object subjected to operation, and moving the mouse cursor while holding that state. FIG. 3B shows an example of moving the rotation center. Details thereof will be described later.

A line segment B shown in FIG. 2B connects the rotation center with a corner of the frame surrounding the drawn object (this frame will be referred to as an "object-selection frame"). The line segment B serves as an operation area for rotating operation. When an operator drags the drawn object by grabbing anywhere on the line segment B with the pointing device, the drawn object is rotated. Although the line segment B shown in FIG. 2B connects the rotation center with the right corner of the object-selection frame, a line segment may connect the rotation center with any point on the object-selection frame. If an operator drags the drawn object by grabbing anywhere in the object-selection frame with the pointing device, except on the line segment B and the rotation center A, the drawn object is moved. Moreover, by using the black square points C, D and E provided on the object-selection frame in FIG. 2B, it is possible to enlarge or reduce the drawn object as has conventionally been performed. If an operator drags the drawn object by grabbing one of the points C located on the four corners of the frame, it is possible to enlarge/reduce the lateral and longitudinal sizes of the drawn object simultaneously. If an operator drags the drawn object by grabbing one of points D which are the center of the upper side and bottom side, it is possible to enlarge/reduce the longitudinal size of the drawn object; while if an operator drags the drawn object by grabbing one of points E which is the center of the left and right sides, it is possible to enlarge/reduce the lateral size of the drawn object. Since this method of moving and enlarging/reducing a drawn object is widely known, detailed description will not be provided.

Figure 4:
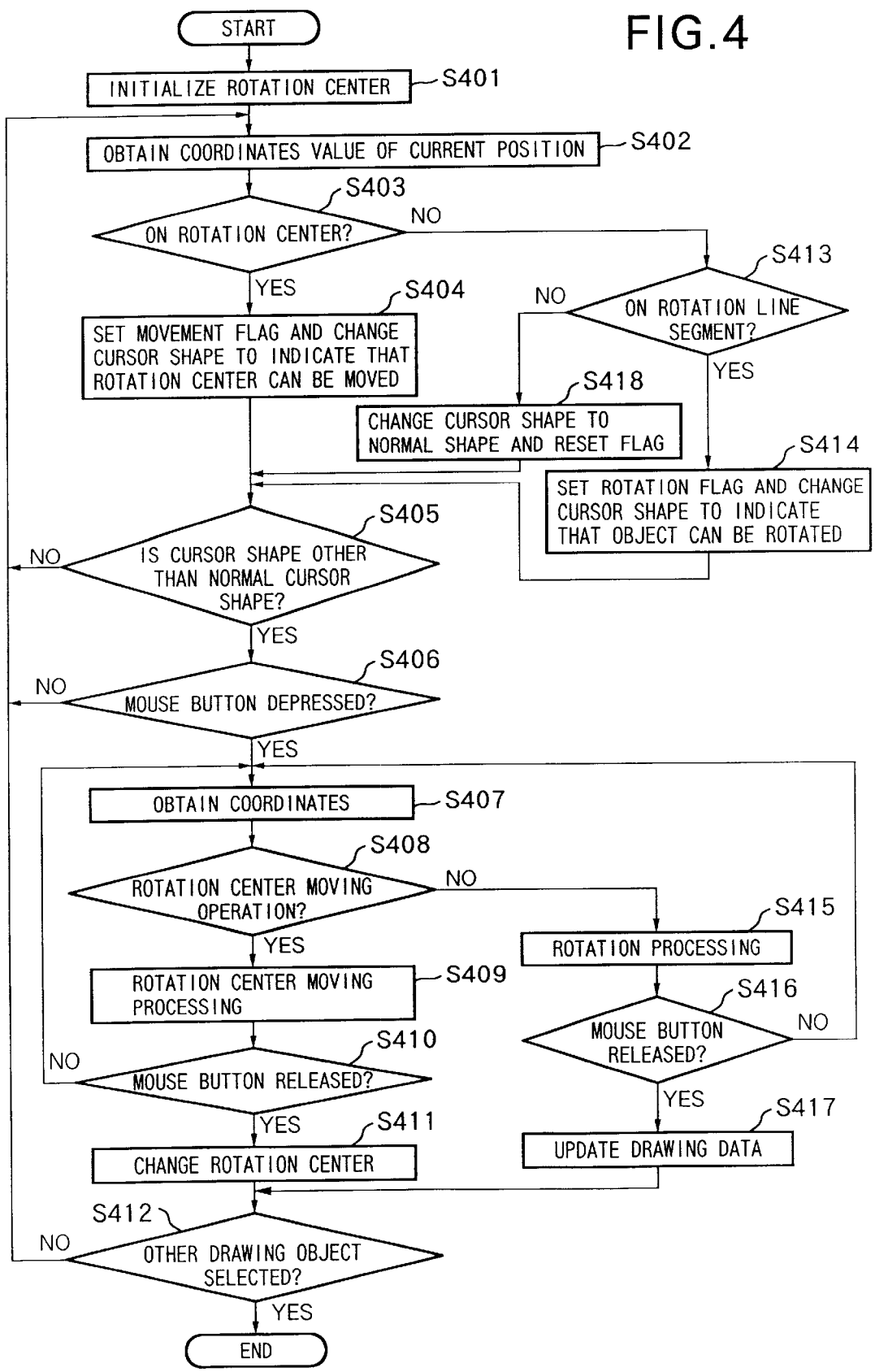
FIG. 4 is a flowchart showing the steps of processing of a drawn object edit program according to the first embodiment.

Next, description will be provided on detailed processing steps of the rotating processing and moving the rotation center, with reference to FIG. 4. The processing shown in FIG. 4 is executed by clicking a mouse button while selecting a drawn object according to the steps shown in FIG. 16.

In step S401 in FIG. 4, a coordinates value of the rotation center of the current-selected drawn object is initialized. As an initial coordinates value of the rotation center, an arbitrary value may be set, for instance, the center of an object-selection frame and the like. The set coordinates value of the center is stored in the RAM 103 and can be referred to by a program and the like when necessary. It should be noted that since the coordinate system or a unit of coordinates value and the like depend upon the data management method of an application program, specific description will not be provided herein.

In step S402, a current position designated by a pointing device, i.e. the mouse cursor position, is obtained. The following description will be provided with an assumption that the pointing device is a mouse, and the position designated by a mouse cursor will be simply referred to as the current position. In step S403, the current position obtained in step S402 is compared with the coordinates value of the rotation center stored in the RAM 103 that is determined in step S401 in order to determine whether or not the mouse cursor is on the rotation center. The rotation center A is represented by an area instead of a point as shown in FIG. 2B, e.g. a circular area. This area is defined as the operation area for moving the rotation center. For this, a circular area, having a predetermined diameter and having a center at a position corresponding to the coordinates value determined in step S401, is calculated. If the current position is within the circular area, it is determined that the mouse cursor is on the rotation center. Herein, if it is determined that the mouse cursor is on the rotation center, the processing proceeds to step S404; otherwise, the processing proceeds to step S413.

Figure 5:
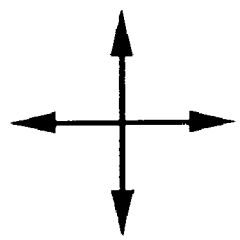
FIG. 5 is an illustration showing a cursor indicating that a designated point can be moved.

In step S404, the shape of the mouse cursor is changed from the normal shape of a mouse cursor, e.g. a simple arrow, to the orthogonal double arrows shown in FIG. 5 which indicates that the rotation center can be moved. In addition, flag information (movement flag), indicating that the rotation center can be moved, is set in the RAM 103. Then, the processing proceeds to step S405. With respect to data related to the shape of a mouse cursor, data may be held in a program as a resource, or data which is already prepared in the system may be used. Herein, the method of obtaining such data will not be specified.

In step S413, it is determined whether or not the coordinates value of the mouse cursor (current position) obtained in step S402 is on the line segment B shown in FIG. 2B. In order to improve operability, the line segment has a certain width so that in a case where the mouse cursor is near the line segment, it is determined that the current position is on the line segment B. Therefore, the line segment and the neighboring area become the operation area for rotating operation. When it is determined in step S413 that the mouse cursor is on the line segment, the processing proceeds to step S414, but if it is determined that the mouse cursor is not on the line segment, the flag information set in steps S404 and S414 is cleared in step S418 to change the shape of the mouse cursor to the normal shape, and the processing proceeds to step S405.

Figure 6:
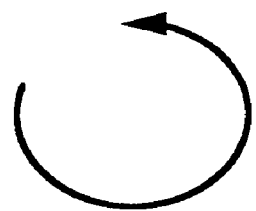
FIG. 6 is an illustration showing a cursor indicating that a designated object can be rotated.

In step S414, the shape of the mouse cursor is changed to the shape shown in FIG. 6 which indicates that the drawn object is rotatable, and flag information (rotation flag), indicating that the drawn object can be rotated, is set in the RAM 103, then the processing proceeds to step S405. With respect to data related to the shape of a mouse cursor, data may be held in a program as a resource, or data which is already prepared in the system may be used. Herein, the method of obtaining such data will not be particularly specified.

In step S405, it is determined whether or not the movement flag or rotation flag is set in step S404 or step S414. In other words, it is determined whether or not the mouse cursor has a shape other than the normal shape. If one of the flags is set, the processing proceeds to step S406; while if neither flag is set, the processing proceeds to step S402. In step S406, it is determined whether or not the mouse button is depressed. Information regarding which button of the mouse is depressed, or how many buttons the mouse has and the like, depends upon generation of an application program and system construction. Therefore, details will not be discussed herein. If it is determined in step S406 that the mouse button is depressed, the processing proceeds to step S407, while if it is not depressed, the processing proceeds to step S402.

In step S407, coordinates value of the mouse cursor (current position) is obtained again. In step S408, based on the flag information (movement flag or rotation flag) stored in the RAM 103 in steps S404 or S414, it is determined whether the rotation center is to be moved or the drawn object is to be rotated. If the rotation center is to be moved, the processing proceeds to step S409; if the drawn object is to be rotated, the processing proceeds to step S415. In step S409, the rotation center A is moved to the current position obtained in step S407, as shown in FIG. 3B. Also, a line segment B' is rewritten in correspondence with the moved rotation center A'. In step S410, determination is made as to whether or not the depressed mouse button is released. If it is determined that the mouse button is released, the processing proceeds to step S411, while if the mouse button is not released, the processing proceeds to step S407. In step S411, the coordinates value obtained in step S408 is stored in the RAM 103 as the coordinates value of a new rotation center, then the processing proceeds to step S412.

In step S415, the drawn object is rotated on the rotation center set in step S401 or S411 by using the coordinates value of the current position of the mouse obtained in step S407. Examples of rotating the drawn object are shown in FIGS. 7A and 7B. FIG. 7A shows an example where the drawn object is rotated 90 degrees on the rotation center A, and FIG. 7B shows an example where the rotation center A is moved to A' and the drawn object is rotated 90 degrees on the rotation center A'. In this case, a line segment B' connecting the new rotation center A' with the corner point of the object-selection frame is used as a handle for rotation. The rotation operation is realized by dragging the line segment B', serving as a rotation handle, until the drawn object is rotated for a desired angle.

In step S416, it is determined whether or not the depressed mouse button is released. If it is determined that the mouse button is released, the processing proceeds to step S417; otherwise, the processing returns to step S407. In step S417, the rotation result is reflected upon the drawing data based on the coordinates value of the mouse cursor obtained in step S407. The drawing data may be stored in the RAM 103, or an external memory 109 such as a floppy disk or hard disk. The storing method differs depending on application programs. Also, the drawing data format differs depending on application programs. Therefore, details thereof will not be specified herein.

Upon updating the drawing data, the processing proceeds to step S412. It is determined in step S412 whether or not another drawn object is selected. If it is determined that no other drawn object is selected, the processing returns to step S402; while if another drawn object is selected, the processing ends.

The drawn object edit program used in the present embodiment is the program codes which execute the flowchart of control steps shown in FIG. 4.

Figure 14:
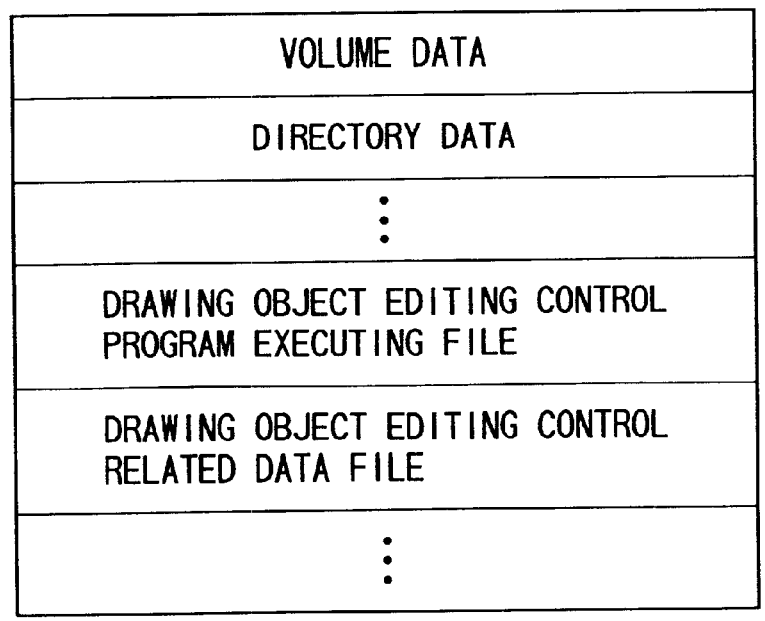
FIG. 14 shows a construction of contents recorded in a medium storing the drawn object edit program.
Figure 15:
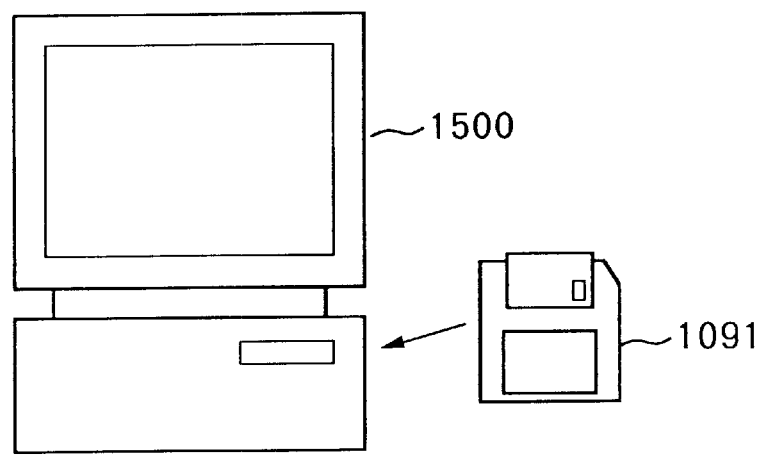
FIG. 15 is an illustration showing that the drawn object edit program is supplied to the present system via a medium which stores the drawn object edit program.

In the case of the present embodiment, the drawn object edit program and related data are stored in the FD 1091 in the form shown in FIG. 14. The drawn object edit program and related data stored in the FD 1091 are loaded to a personal computer system 1500 shown in FIG. 15 via the DKC 108. Upon setting the FD 1091 in the DKC 108, the drawn object edit program and related data are read out of the FD 1091 by controlling operation of the OS and basic I/O program, and loaded to the RAM 103 then become executable.

Figure 13:
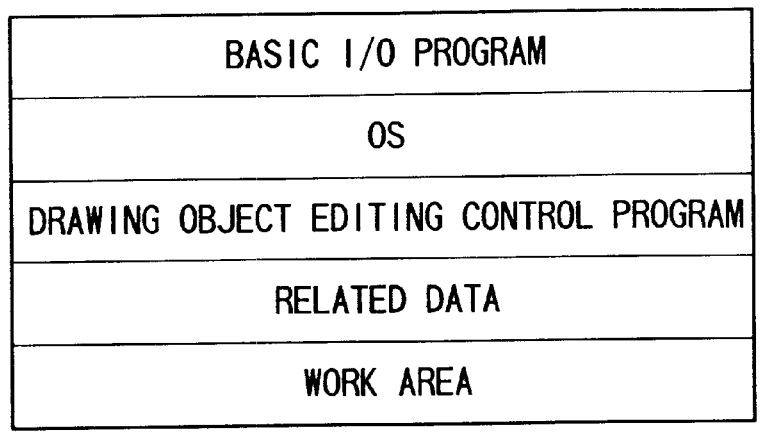
FIG. 13 shows a memory map of the present system.

FIG. 13 shows a memory map where the drawn object edit program is loaded to the RAM 103, thus being executable.

As described above, in the image processing system where the drawn object edit program according to the present embodiment is executed, an operator does not need to designate a specific mode for rotating a designated drawn object or for moving the rotation center of the drawn object. By placing a mouse cursor at a predetermined position, the operator is able to designate these operation. Herein, the predetermined position for rotating the drawn object is the handle (e.g., handle B shown in FIG. 2B) which is extended from the rotation center, and the neighboring area of the handle. The predetermined position for moving the rotation center is the center point of rotation (e.g., the rotation center A in FIG. 2B) and its neighboring area. Accordingly, it is unnecessary to designate a mode for moving the rotation center or a mode for rotating the drawn object. Directly operating the drawn object enables to perform each of the operation; thus, it is possible to improve operability of the system.

The present embodiment describes, as an example, a case where the drawn object edit program and related data are directly loaded from the FD 1091 to the RAM 103. Besides this, it is also possible to first store (install) the drawn object edit program and related data: in the HD 1092 from the FD 1091, and load them from the HD 1092 to the RAM 103 when executing the drawn object edit program.

Besides a floppy disk, a CD-ROM, IC memory card and the like may be used as a medium for recording the drawn object edit program according to the present embodiment. Furthermore, it is also possible to store the drawn object edit program in the ROM 102 so that it is included as a part of the memory map, and the program is executed directly by the CPU 101.

Note that the steps shown in FIG. 4 are executed when the OS supplies information indicative of the mouse button being depressed and information regarding a current mouse cursor position. In a case where the OS supplies, upon dragging operation, the information indicative of a mouse being dragged and coordinates values of the mouse cursor before and after the dragging operation, the coordinates value before dragging operation is obtained in step S402 in FIG. 4, and the coordinates value after the dragging operation is obtained in step S407. Moreover, since the determination of whether or not the mouse button is depressed does not need to be performed by the application program, the processing steps S406, S410 and S416 become unnecessary. It should be noted that the shape of the mouse cursor is modified by the OS operation.

[Second Embodiment]

Figure 8:
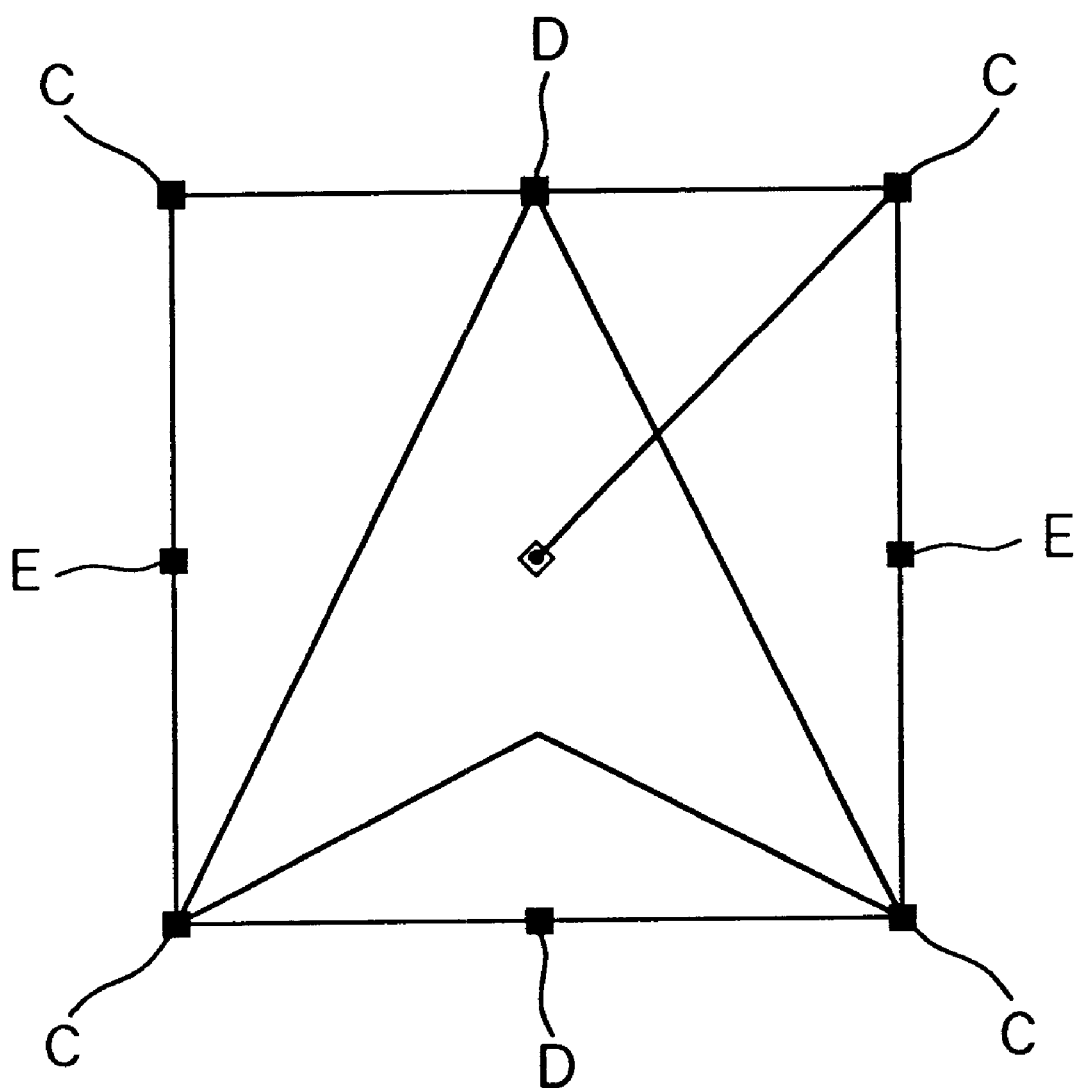
FIG. 8 is a diagram showing drag points for skewing processing.

The second embodiment realizes skew modifying processing on a drawn object without requiring an operator to designate a specific mode for this processing. FIG. 8 shows drag points which are dragged for skewing a selected drawn object. The points D in FIG. 8 are drag points normally used for longitudinally enlarging/reducing the drawn object. However, in the present embodiment, the points D are used to realize skewing processing in the horizontal direction. The points D are utilized to determine the moving direction of the pointing device. If the pointing device is moved horizontally, the selected drawn object is skewed in the horizontal direction. Note that the description in the second embodiment is provided also with an assumption that the pointing device is a mouse. The points E in FIG. 8 are drag points normally used for laterally enlarging/reducing the drawn object. However, in the present embodiment, the points E are used to realize skewing processing in the vertical direction. The points E are utilized to determine the moving direction of the mouse. If the mouse is moved vertically, the selected drawn object is skewed in the vertical direction. Herein, skewing processing in the horizontal direction is realized by converting coordinates values in a rectangular coordinate system, which defines an original image, to coordinates values in a coordinate system whose vertical axis is skewed. Skewing processing in the vertical direction is realized by converting coordinates values in a rectangular coordinate system, which defines an original image, to coordinates values in a coordinate system whose horizontal axis is skewed.

Next, description will be provided on detailed processing of skew modifying processing with reference to FIG. 9.

In step S901, a coordinates value of the current position designated by a mouse is obtained. In step S902, it is determined whether or not the coordinates value obtained in step S901 is on one of the points D in FIG. 8. The points D are represented not by a mere point, but by a small square operation area as shown in FIG. 8. If the position designated by the mouse is within the square operation area, it is determined that the mouse cursor is on a point D in FIG. 8. Herein, if it is determined that the mouse cursor is on a point D in FIG. 8, the processing proceeds to step S903; otherwise, the processing proceeds to step S913.

Figure 10A:
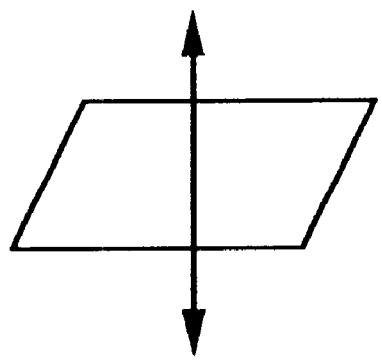
FIGS. 10A and 10B are illustration showing a cursor indicating that a designated object can be skewed.

In step S903, the shape of the mouse cursor is changed to a shape shown in FIG. 10A which indicates that a selected drawn object can be horizontally skewed. Then, flag information (horizontal flag), indicating that the object can be horizontally skewed, is set in the RAM 103 and the processing proceeds to step S904. The data related to the shape of the mouse cursor may be stored in a program as a resource, or data which is already prepared in the system may be used. Herein, the method of obtaining such data will not be specified.

In step S913, it is determined whether or not the coordinates value obtained in step S901 is on one of the points E in FIG. 8. The points E are represented not by a mere point, but by a small square operation area as shown in FIG. 8. If the position designated by the mouse is within the square operation area, it is determined that the mouse cursor is on a point E in FIG. 8 and the processing proceeds to step S914; otherwise, the flag information is cleared and the processing proceeds to step S904.

Figure 10B:
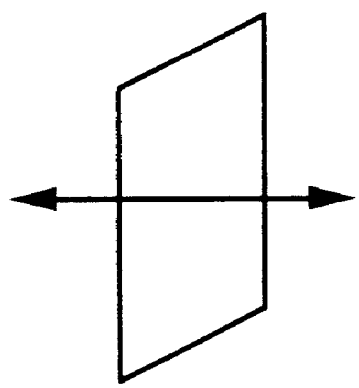

In step S914, the shape of the mouse cursor is changed to a shape shown in FIG. 10B which indicates that a selected drawn object can be vertically skewed. Then, flag information (vertical flag), indicating that the object can be vertically skewed, is set in the RAM 103 and the processing proceeds to step S904. The data related to the shape of the mouse cursor may be stored in a program as a resource, or data which is already prepared in the system may be used. Herein, the method of obtaining such data will not be particularly specified.

It is determined in step S904 whether or not the shape of the mouse cursor has been changed in steps S903 or S914, i.e., whether or not values of the flag information (horizontal flag and vertical flag) have been changed. In a case where either the horizontal flag or the vertical flag is set, the processing proceeds to step S905, while if neither flag is set, the processing returns to step S901. It is determined in step S905 whether or not the mouse button is depressed. Which button is depressed or how many button the mouse has and the like will not be discussed herein since they depend upon the system construction and the way the application program is made. If it is determined that the mouse button is depressed, the processing proceeds to step S906, otherwise the processing returns to step S901.

In step S906, a coordinates value at which the mouse button is depressed is stored in the RAM 103 as a drag-starting point. In step S907, a coordinates value of the current position designated by the mouse is obtained and stored in the RAM 103. In step S908, the coordinates value of the drag-starting point obtained in step S906 is compared with the coordinates value of the current position obtained in step S907 to determine whether or not the mouse has been moved from the drag-starting point. If it is determined that the mouse has been moved, the processing proceeds to step S909, while if the mouse has not been moved, the processing proceeds to step S907 where a coordinates value of the current position designated by the mouse is obtained again.

In step S909, it is determined whether or not the point D or E is dragged to a "skew modification area" shown in FIGS. 11A and 11B. FIGS. 11A and 11B show respective four areas 1101 to 1104 and 1105 to 1108, which are divided by straight lines having an inclination of 45 degrees, intersecting at the point D or point E. Regarding the coordinates value of the drag-starting point obtained in step S906 as the rotation center D or E, it is determined in step S909 within which area (1101 to 1104 or 1105 to 1108) of the pattern (FIG. 11A or 11B) the coordinates value of the current position obtained in step S907 falls. Based on the area within which the coordinates value of the current position falls, the type of modification processing is determined. Herein, if the flag information (horizontal flag), indicating that the object can be horizontally skewed, is set in step S903, the determination is made according to the pattern shown in FIG. 11A. If the flag information (vertical flag), indicating that the object can be vertically skewed, is set in step S903, the determination is made according to the pattern shown in FIG. 11B. In other words, when the mouse cursor is moved to the area of "skew modification" (1101 or 1102) in FIG. 11A while the horizontal flag is set, or when the mouse cursor is moved to the area of "skew modification" (1105 or 1106) in FIG. 11B while the vertical flag is set, the operation is determined as skew modifying processing.

Figure 12B:
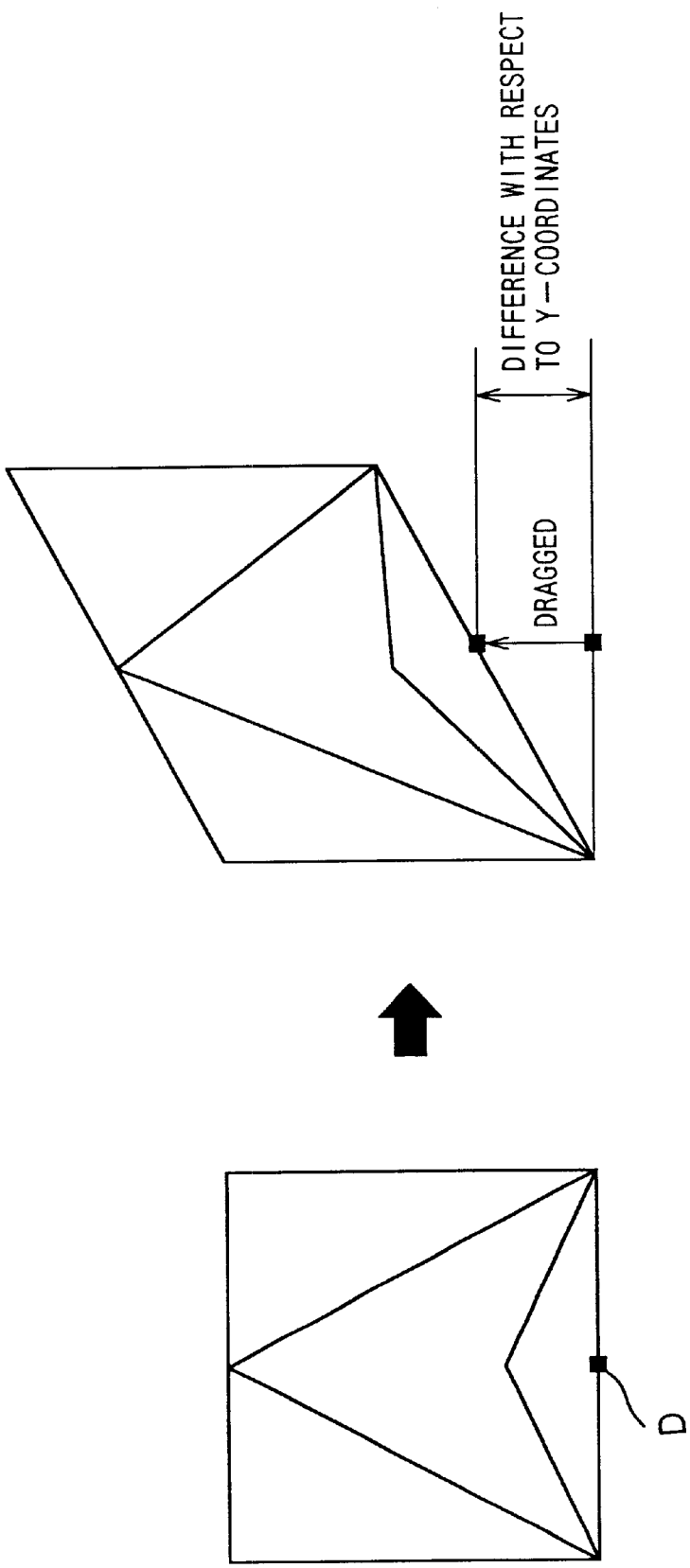

When it is determined that the designated operation is skew modifying processing, the processing proceeds to step S910. When it is determined that the designated operation is enlarge/reduce processing, the processing proceeds to step S915. In step S910, skew modifying processing as shown in FIGS. 12A and 12B is performed by utilizing a difference between the coordinates value of the drag-starting point and coordinates value of the current position designated by the mouse. In a case of skewing a drawn object in the horizontal direction, as shown in FIG. 12A, a difference between the X component of the coordinates value obtained in step S906 and the X component of the coordinates value obtained in step S907 or S912 is obtained, and the drawn object of interest is skewed for the obtained difference value in the direction of cursor movement. In a case of skewing a drawn object in the vertical direction, as shown in FIG. 12B, a difference with respect to the Y component of the coordinates values is obtained in the similar manner to the case of horizontal skew processing. In step S911, it is determined whether or not the depressed mouse button is released. If it is determined that the mouse button is released, the skew modifying. processing ends and the processing proceeds to step S918. If it is determined that the mouse button is not released, a coordinates value of the current position designated by the mouse is obtained again in step S912 and the processing returns to step S910.

In step S915, the drawn object is enlarged or reduced. Enlarge/reduce processing is executed when the mouse is dragged to the "enlargement/reduction" area (1103 or 1104, 1107 or 1108) in FIG. 11A or FIG. 11B. Referring to FIG. 8, if a point D is dragged to the enlargement/reduction area with a mouse, the drawn object is longitudinally enlarged/reduced in accordance with the direction of the mouse movement, but if a point E is dragged, the drawn object is laterally enlarged/reduced. In step S916, it is determined whether or not the depressed mouse button is released. If it is determined that the mouse button is released, the enlarge/reduce processing ends and the processing proceeds to step S918. If it is determined that the mouse button is not released, a coordinates value of the current position designated by the mouse is obtained again in step S917 and the processing returns to step S915. In step S918, the drawing data is updated based on the result of the modification.

The drawing data may be stored in the RAM 103, or an external memory 109 such as a floppy disk or hard disk. The storing method differs depending on application programs. Also, the drawing data format differs depending on application programs. Therefore, details thereof will not be specified herein. Upon updating the drawing data, the processing proceeds to step S919 where it is determined whether or not another drawn object is selected. If another drawn object is not selected, the processing returns to step S901, while if another drawn object is selected, the processing ends.

The drawn object edit program used in the present embodiment is the program codes which execute the flowchart of control steps shown in FIG. 9.

As set forth above, in the object edit program according to the present embodiment, the cursor position on a drawn object or movement of the cursor decide the contents of processing. By virtue of this, it is not necessary to designate a mode for particular processing. Accordingly, operability is improved and the efficiency of drawn object editing processing is increased.

In the case of the present embodiment, the drawn object edit program and related data are stored in the FD 1091 in the form shown in FIG. 14. The drawn object edit program and related data recorded in the FD 1091 can be loaded to the present system via the DKC 108 shown in FIG. 1. Upon setting the FD 1091 in the DKC 108, the drawn object edit program and related data are read out of the FD 1091 by controlling operation of the OS and basic I/O program, and loaded to the RAM 103, then become executable.

FIG. 13 shows a memory map where the drawn object edit program is loaded to the RAM 103, thus being executable.

The present embodiment describes, as an example, a case where the drawn object edit program and related data are directly loaded from the FD 1091 to the RAM 103. Besides this, it is also possible to first store (install) the drawn object edit program and related data in the HD 1092 from the FD 1091, and load them from the HD 1092 to the RAM 103 when executing the drawn object edit program.

Besides a floppy disk, a CD-ROM, IC memory card and the like may be used as a medium for recording the drawn object edit program according to the present embodiment. Furthermore, it is also possible to store the drawn object edit program in the ROM 102 so that it is included as a part of the memory map, and the program is executed directly by the CPU 101.

Note that the steps shown in FIG. 9 are executed when the OS supplies information indicative of the mouse button being depressed and information regarding a current mouse cursor position. In a case where the OS supplies, upon dragging operation, the information indicative of a mouse being dragged and coordinates values of the mouse cursor before and after the dragging operation, the coordinates value before dragging operation is obtained in step S901 in FIG. 9, and the coordinates value after the dragging operation is obtained in steps S912 or S917. In addition, since the shape of a mouse cursor is modified by the OS, the processing steps S902 to S904, S913 and S914 become unnecessary. Moreover, since the determination of whether or not the mouse button is depressed does not need to be performed by an application program, the processing steps S905 to S908, S911, S912, S916 and S917 become unnecessary. The determination in step S909 is performed based on a coordinates value obtained after the dragging operation.

[Third Embodiment]

Figure 17A:
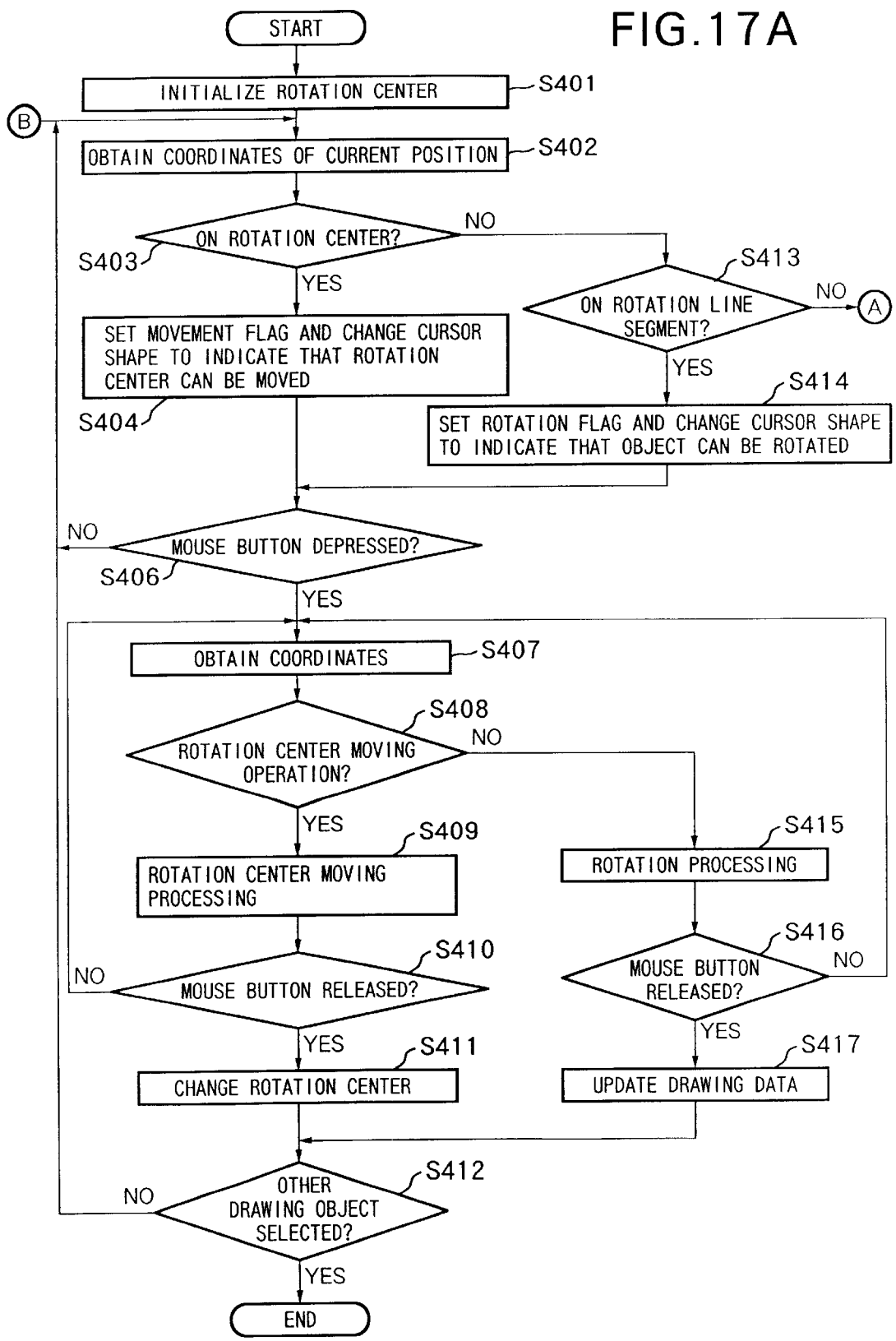
FIGS. 17A and 17B are flowcharts showing the steps of processing of a drawn object edit program according to the third embodiment.
Figure 17B:
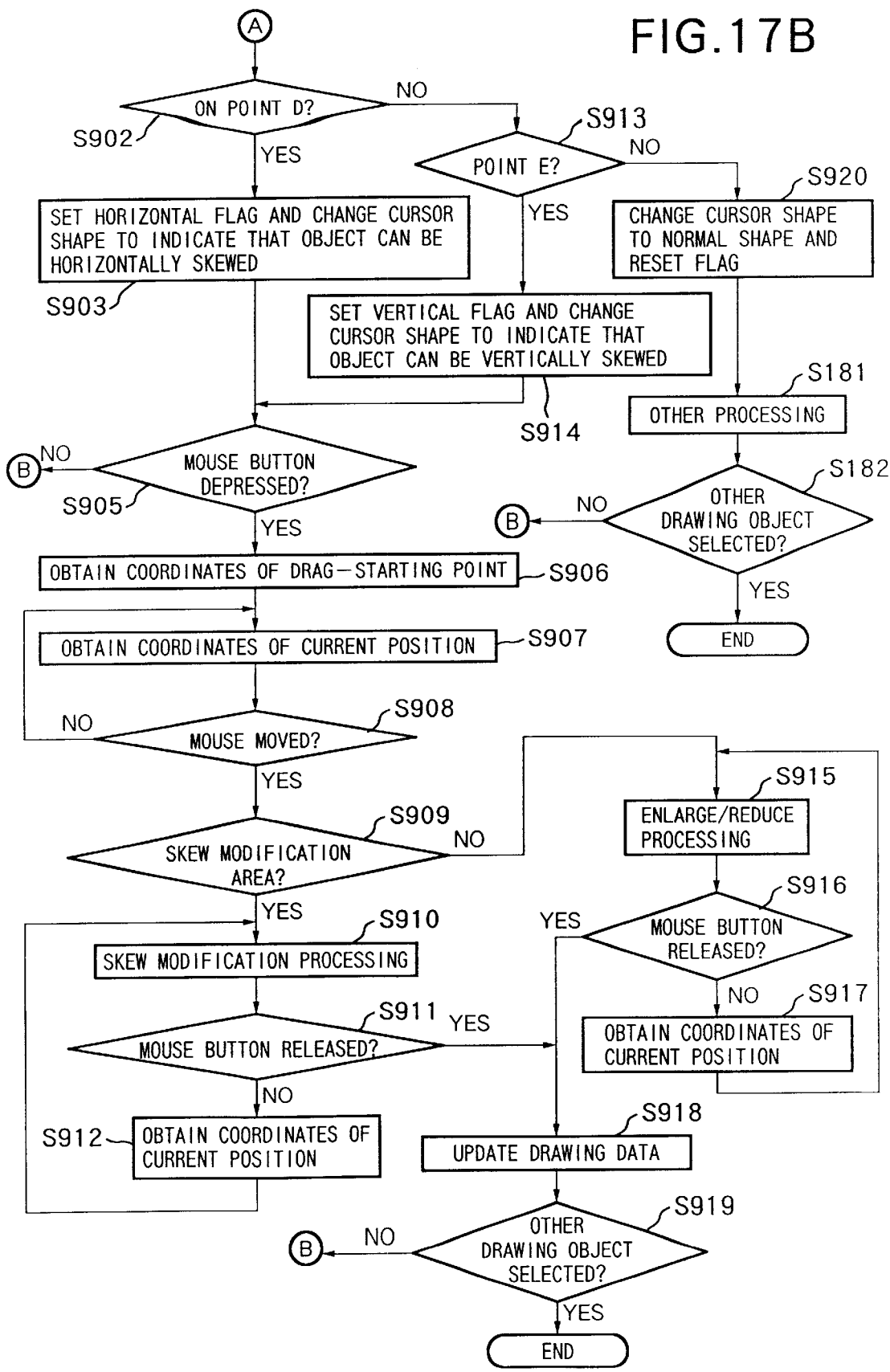

The processing steps of the drawn object edit program in the image processing system according to the third embodiment are shown in FIGS. 17A and 17B. The system construction is the same as that of the first and second embodiments. The processing steps shown in FIGS. 17A and 17B are obtained by combining the steps shown in FIG. 4 and FIG. 9. In a case where the point A or the line segment B in the drawn object in FIG. 2B is dragged, the rotation center of the object is moved, or the drawn object is rotated in the manner described in the first embodiment. In a case where a point D or E in FIG. 8 is dragged, the drawn object is skewed or enlarged/reduced in the manner described in the second embodiment.

In FIGS. 17A and 17B, the same reference numerals are assigned to the components and processing common to those of FIGS. 4 and 9. Description will not be provided on those common components and processing; however, description will be given on processing steps that are different from those of FIGS. 4 and 9.

When a displayed drawn object is selected according to the processing in FIG. 16 and a mouse button is clicked, the processing in FIG. 17A is started. In FIG. 17A, being different from FIG. 4, if it is determined in step S413 that the obtained coordinates value of the mouse cursor (current position) is not on the line segment B, the processing proceeds to step S902 in FIG. 17B. In other words, when the shape of the mouse cursor does not change, the processing proceeds to step S902 in FIG. 17B. Therefore, the determination process in step s405 becomes unnecessary in the third embodiment. If the coordinates value of the drag-starting point is on the rotation center A of the drawn object or on the rotation line segment B, the system according to the present embodiment performs the processing steps same as that of the first embodiment; otherwise, the system executes the processing steps shown in FIG. 17B.

In FIG. 17B, based on the coordinates value of the drag-starting point obtained in step S401 in FIG. 17A, it is determined whether the drag operation is for horizontal skew processing or vertical skew processing or enlarge/reduce processing; and the processing same as that of the second embodiment is performed. Note that in step S913 in FIG. 17B, if the drag-starting point is not at a position for skew modification, the processing proceeds to step S920 where the flag information is cleared and the shape of the mouse cursor is changed to the normal shape. In step S181, other processing (not shown in the drawing) corresponding to that position is performed. Upon performing an appropriate processing, it is determined whether or not another drawn object is selected. If another drawn object is selected, the processing ends; while if another drawn object is not selected, the processing proceeds to step S402 in FIG. 17A. When the determination in steps S905 and S919 in FIG. 17B results in NO, the processing also proceeds to step S420 in FIG. 17A. As an example of processing in step S181, it is possible to enlarge/reduce a drawn object in the lateral and longitudinal directions simultaneously. The points C in FIG. 8 are the operation point for changing the lateral and longitudinal sizes of the drawn object simultaneously. Dragging a point C is regarded as enlarge/reduce operation. The designated point C is moved to the dragged point, and the drawn object is enlarged/reduced accordingly.

By performing the above-described processing, an operator of the image processing system according to the present embodiment is able to perform desired operation corresponding to a drag-starting point on the drawn object, without designating a mode for rotation, skew modifying processing and the like. Accordingly, operability of the system is improved and the efficiency of drawn object editing processing is increased.

Note that in the first to third embodiments, in addition to the frame which surrounds the drawn object ("object-selection frame"), the operation points A, C to E and operation line segment B are displayed as an operation area for image processing. As long as an operator can easily confirm the amount of operation, these areas may be represented by any shape.

[Other Embodiment]

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As has been described above, according to the present invention, when an operator performs editing of a drawn object, the operator is able to move the rotation center, rotate the drawn object, or skew the drawn object without designating an operation mode. Therefore, it is possible to improve operability and increase production efficiency.

The present invention is not limited to the above embodiments and various changes and modifications can be made within the spirit and scope of the present invention. Therefore, to appraise the public of the scope of the present invention, the following claims are made.

What is claimed is:

1. A graphic processing apparatus, comprising:
a display, arranged to display a graphical object and an object-selection frame including a horizontal line and a vertical line; and
a processor, arranged to perform (a) a skew modification of the graphical object when a first drag point on the horizontal line is selected and dragged along the horizontal direction, (b) at least one of an enlargement and a reduction modification of the graphical object when the first drag point on the horizontal line is selected and dragged along a vertical direction, (c) a skew modification of the graphical object when a second drag point on the vertical line is selected and dragged along the vertical direction and (d) at least one of an enlargement and a reduction modification of the graphical object when the second drag point on the vertical line is selected and dragged along the horizontal direction.

2. The apparatus according to claim 1, wherein said display displays an icon indicating that the graphical object can be skewed in the horizontal direction when the first drag point is selected, and displays an icon indicating that the graphical object can be skewed in the vertical direction when the second drag point is selected.

3. The apparatus according to claim 1, wherein said processor updates stored data corresponding to the graphical object after modifying the graphical object, based on a result of the modification.

4. The apparatus according to claim 1, wherein said display also displays a rotational center and a line segment connecting the rotational center to a corner point of a frame of the graphical object, and said processor changes a position of the rotational center when the rotational center is selected and dragged, and rotates the graphical object when the line segment is selected and dragged.

5. The apparatus according to claim 1, wherein said processor determines whether the first or second drag point is dragged in the horizontal direction or the vertical direction, depending on which one of four areas the drag point is dragged to, wherein the four areas are formed in a single larger area that is divided into the four areas by two straight lines intersecting at the drag point.

6. A graphic processing method, comprising the steps of:
displaying a graphical object and an object-selection frame including a horizontal line and a vertical line; and
a processing step of performing (a) a skew modification of the graphical object when a first drag point on the horizontal line is selected and dragged along the horizontal direction, (b) at least one of an enlargement and a reduction modification of the graphical object when the first drag point on the horizontal line is selected and dragged along a vertical direction, (c) a skew modification of the graphical object when a second drag point on the vertical line is selected and dragged along the vertical direction and (d) at least one of an enlargement and a reduction modification of the graphical object when the second drag point on the vertical line is selected and dragged along the horizontal direction.

7. The method according to claim 6, wherein an icon is displayed that indicates that the graphical object can be skewed in the horizontal direction when the first drag point is selected, and an icon is displayed that indicates that the graphical object can be skewed in the vertical direction when the second drag point is selected.

8. The method according to claim 6, further comprising the step of updating stored data corresponding to the graphical object after modifying the graphical object, based on a result of the modification.

9. The method according to claim 6, wherein the step of displaying the graphical object also includes displaying a rotational center and a line segment connecting the rotational center to a corner point of a frame of the graphical object, and wherein said processing step changes a position of the rotational center when the rotational center is selected and dragged, and rotates the graphical object when the line segment is selected and dragged.

10. The method according to claim 6, wherein said processing step also determines whether the first or second drag point is dragged in a horizontal direction or a vertical direction, depending on which one of four areas the drag point is dragged to, wherein the four areas are formed in a single larger area that is divided into the four areas by two straight lines intersecting at the drag point.

11. A computer-readable storage medium storing program code having instructions for performing a graphic processing method, the method comprising the steps of:
displaying a graphical object and an object selection frame including a horizontal line and a vertical line; and
a processing step, of performing (a) a skew modification of the graphical object when a first drag point on the horizontal line is selected and dragged along the horizontal direction, (b) at least one of an enlargement and a reduction modification of the graphical object when the first drag point on the horizontal line is selected and dragged along a vertical direction, (c) a skew modification of the graphical object when a second drag point on the vertical line is selected and dragged along the vertical direction and (d) at least one of an enlargement and a reduction modification of the graphical object when the second drag point on the vertical line is selected and dragged along the horizontal direction.

12. The computer-readable storage medium according to claim 11, wherein the method further comprises the steps of:
displaying an icon indicating that the graphical object can be skewed in the horizontal direction when the first drag point is selected, and displaying an icon indicating that the graphical object can be skewed in the vertical direction when the second drag point is selected.

13. The computer-readable storage medium according to claim 11, wherein the method further comprises the step of updating stored data corresponding to the graphical object after modifying the graphical object, based on a result of the modification.

14. The computer-readable storage medium according to claim 11, wherein the step of displaying the graphical object includes displaying a rotational center and a line segment connecting the rotational center to a corner point of a frame of the graphical object, and wherein said processing step changes a position of the rotational center when the rotational center is selected and dragged, and rotates the graphical object when the line segment is selected and dragged.

15. The computer-readable storage medium method according to claim 11, wherein said processing step also determines whether the first or second drag point is dragged in a horizontal direction or a vertical direction, depending on which one of four areas the drag point is dragged to, wherein the four areas are formed in a single larger area that is divided into the four areas by two straight lines intersecting at the drag point.

16. A program product comprising code having computer-executable instructions for performing a graphic processing method, the method comprising the steps of:

displaying a graphical object and an object-selection frame including a horizontal line and a vertical line; and a processing step of performing (a) a skew modification of the graphical object when a first drag point on the horizontal line is selected and dragged along the horizontal direction, (b) at least one of an enlargement and a reduction modification of the graphical object when the first drag point on the horizontal line is selected and dragged along a vertical direction, (c) a skew modification of the graphical object when a second drag point on the vertical line is selected and dragged along the vertical direction and (d) at least one of an enlargement and a reduction modification of the graphical object when the second drag point on the vertical line is selected and dragged along the horizontal direction.

17. The program product according to claim 16, further comprising the steps of:

displaying an icon indicating that the graphical object can either be skewed in the horizontal direction when the first drag point is selected, and displaying an icon indicating that the graphical object can be skewed in the vertical direction when the second drag point is selected.

18. The program product according to claim 16, wherein the method further comprises the step of updating stored data corresponding to the graphical object after modifying the graphical object, based on a result of the modification.

19. The program product according to claim 16, wherein the step of displaying the graphical object also includes displaying a rotational center and a line segment connecting the rotational center to a corner point of a frame of the graphical object, and wherein said processing step changes a position of the rotational center when the rotational center is selected and dragged, and rotates the graphical object when the line segment is selected and dragged.

20. The program product according to claim 16, wherein said processing step also determines whether the first or second drag point is dragged in a horizontal direction or a vertical direction, depending on which one of four areas the drag point is dragged to, wherein the four areas are formed in a single larger area that is divided into the four areas by two straight lines intersecting at the drag point.

* * * * *

UNITED STATES PATENT AND TRADEMARK OFFICE
CERTIFICATE OF CORRECTION

PATENT NO. : 6,469,709 B1
DATED : October 22, 2002
INVENTOR(S) : Tetsuo Sakai

It is certified that error appears in the above-identified patent and that said Letters Patent is hereby corrected as shown below:

Column 1,
Line 24, "Pointing" should read -- pointing --.

Column 3,
Line 24, "upon" should read -- when --.

Column 7,
Line 13, "operation." should read -- operations. --;
Line 22, "enables to perform each of the operation" should read -- enables performance of each of the operations --; and
Line 29, "data:" should read -- data --.

Column 8,
Line 67, "button" should read -- buttons --.

Column 9,
Line 65, "modifying." should read -- modifying --.

Column 11,
Line 46, "s405" should read -- S405 --.

Column 13,
Line 4, "appraises" should read -- apprise --.

Signed and Sealed this

Sixteenth Day of September, 2003

JAMES E. ROGAN
*Director of the United States Patent and Trademark Office*